United States Patent
Tajiri et al.

(10) Patent No.: US 11,008,943 B2
(45) Date of Patent: May 18, 2021

(54) FAN CASING ASSEMBLY WITH COOLER AND METHOD OF MOVING

(71) Applicant: Unison Industries, LLC, Jacksonville, FL (US)

(72) Inventors: Gordon Tajiri, Allentown, PA (US); Michael Thomas Kenworthy, Gilbert, AZ (US); Dennis Alan McQueen, Miamisburg, OH (US); Dattu G V Jonnalagadda, Ponnur (IN)

(73) Assignee: Unison Industries, LLC, Jacksonville, FL (US)

( * ) Notice: Subject to any disclaimer, the term of this patent is extended or adjusted under 35 U.S.C. 154(b) by 494 days.

(21) Appl. No.: 15/405,937

(22) Filed: Jan. 13, 2017

(65) Prior Publication Data

US 2018/0058327 A1    Mar. 1, 2018

Related U.S. Application Data

(63) Continuation-in-part of application No. 15/252,718, filed on Aug. 31, 2016, now abandoned.

(51) Int. Cl.
*F02C 7/14* (2006.01)
*F02K 3/04* (2006.01)
(Continued)

(52) U.S. Cl.
CPC .................. *F02C 7/14* (2013.01); *F02C 7/18* (2013.01); *F02K 3/04* (2013.01); *F02K 3/105* (2013.01);
(Continued)

(58) Field of Classification Search
CPC ...... F02C 7/14; F02C 7/18; F02K 3/04; F02K 3/105; F28D 1/06; F28D 7/0041;
(Continued)

(56) References Cited

U.S. PATENT DOCUMENTS 8,096,105 B2    1/2012  Porte
8,387,362 B2    3/2013  Storage et al.
(Continued)

FOREIGN PATENT DOCUMENTS

CN    101149028 A    3/2008
CN    101178027 A    5/2008
(Continued)

OTHER PUBLICATIONS

Extended European Search Report and Opinion issued in connection with corresponding EP Application No. 18150802.9 dated May 25, 2018.
(Continued)

*Primary Examiner* — Kenneth Bomberg
*Assistant Examiner* — Julian B Getachew
(74) *Attorney, Agent, or Firm* — McGarry Bair PC

(57) ABSTRACT

An apparatus and method for cooling a fluid within a turbine engine. A fan casing assembly for the turbine engine can include an annular fan casing with a peripheral wall having a flow path defined through the casing. A fan casing cooler includes a body to confront the peripheral wall with at least one conduit configured to carry a flow of heated fluid to convectively cool the heated fluid with a flow of air through the flow path.

16 Claims, 10 Drawing Sheets

(51) Int. Cl.
*F28F 5/00* (2006.01)
*F28F 21/08* (2006.01)
*F28D 1/06* (2006.01)
*F02K 3/105* (2006.01)
*F28D 7/00* (2006.01)
*F28F 1/02* (2006.01)
*F02C 7/18* (2006.01)

(52) U.S. Cl.
CPC ............ *F28D 1/06* (2013.01); *F28D 7/0041* (2013.01); *F28F 1/022* (2013.01); *F28F 5/00* (2013.01); *F28F 21/084* (2013.01); *F05D 2260/213* (2013.01); *F05D 2300/50212* (2013.01); *F28F 2215/14* (2013.01); *F28F 2255/04* (2013.01); *F28F 2255/06* (2013.01); *F28F 2280/105* (2013.01); *Y02T 50/60* (2013.01)

(58) Field of Classification Search
CPC ........ F28D 7/00; Y02T 50/672; Y02T 50/676; F05D 2260/20; F05D 2260/213; F05D 2300/50212; F28F 2255/02; F28F 1/022; F28F 5/00; F28F 21/084; F28F 2215/14; F28F 2255/04; F28F 2255/06; F28F 2280/105; F28F 1/10; F28F 13/00; F28F 2013/008; B64D 33/12
USPC .......................................... 415/177; 165/276
See application file for complete search history.

(56) References Cited

U.S. PATENT DOCUMENTS

| | | | |
|---|---|---|---|
| 8,434,293 B2* | 5/2013 | Widdle, Jr. | ............... F02K 1/10 60/264 |
| 8,510,945 B2 | 8/2013 | Hand et al. | |
| 8,561,386 B2 | 10/2013 | Mons | |
| 8,601,792 B2 | 12/2013 | Mylemans | |
| 9,903,274 B2 | 2/2018 | Diaz et al. | |
| 2008/0095611 A1* | 4/2008 | Storage | ................. F01D 25/125 415/116 |
| 2011/0030337 A1* | 2/2011 | Mons | ..................... F01D 25/12 60/226.1 |
| 2011/0146944 A1 | 6/2011 | Hand et al. | |
| 2011/0185731 A1 | 8/2011 | Mylemans | |
| 2013/0255931 A1* | 10/2013 | Arnett | ..................... F28F 27/00 165/287 |
| 2014/0202158 A1* | 7/2014 | Storage | ..................... F02C 7/12 60/722 |
| 2015/0135726 A1* | 5/2015 | Hundley, Jr. | ............. F02C 7/12 60/796 |
| 2016/0131035 A1* | 5/2016 | Diaz | ......................... F02C 7/14 60/226.1 |
| 2018/0058327 A1 | 3/2018 | Tajiri et al. | |

FOREIGN PATENT DOCUMENTS

| | | |
|---|---|---|
| CN | 102007363 A | 4/2011 |
| CN | 102108900 A | 6/2011 |
| CN | 102135036 A | 7/2011 |
| EP | 1937954 B1 | 2/2010 |
| EP | 2339144 A2 | 6/2011 |
| EP | 2288862 B1 | 11/2011 |
| EP | 2462330 B1 | 6/2014 |
| EP | 3023724 A1 | 5/2016 |
| EP | 3290673 A1 | 3/2018 |
| JP | 2009512807 A | 3/2009 |
| JP | 2011149420 A | 8/2011 |
| JP | 2016090226 A | 5/2016 |
| JP | 2018059501 A | 4/2018 |
| WO | 2007045754 A1 | 4/2007 |
| WO | 2009138613 A1 | 11/2009 |
| WO | 2011016973 A2 | 2/2011 |
| WO | 2014197488 A1 | 12/2014 |

OTHER PUBLICATIONS

Office Action issued in connection with corresponding CA Application No. 2991736 dated Oct. 1, 2018.
Chinese Patent Office, Chinese Office Action re Chinese Patent Application No. 201810030447.1, dated Nov. 4, 2019, 11 pages, China.
Japanese Office Action for Counterpart JP2017-250359, dated Mar. 12, 2019.

* cited by examiner

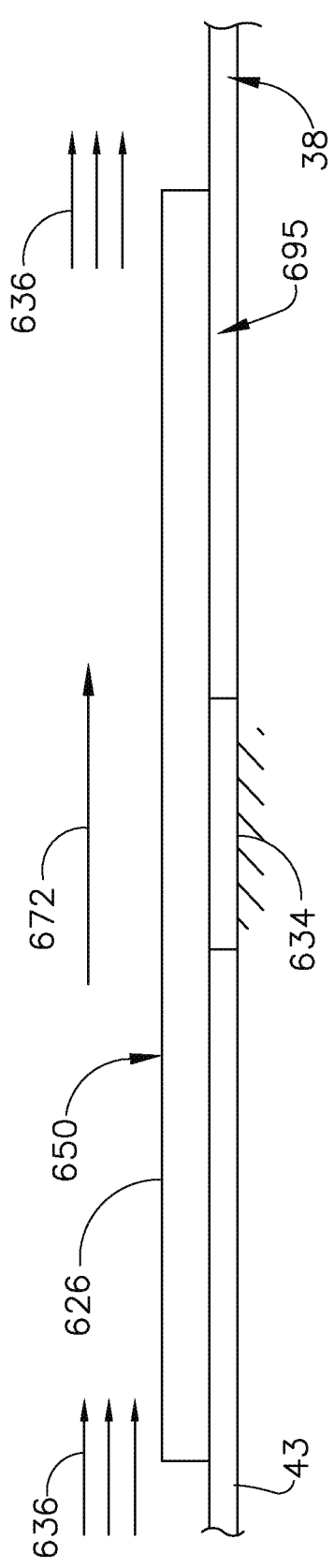
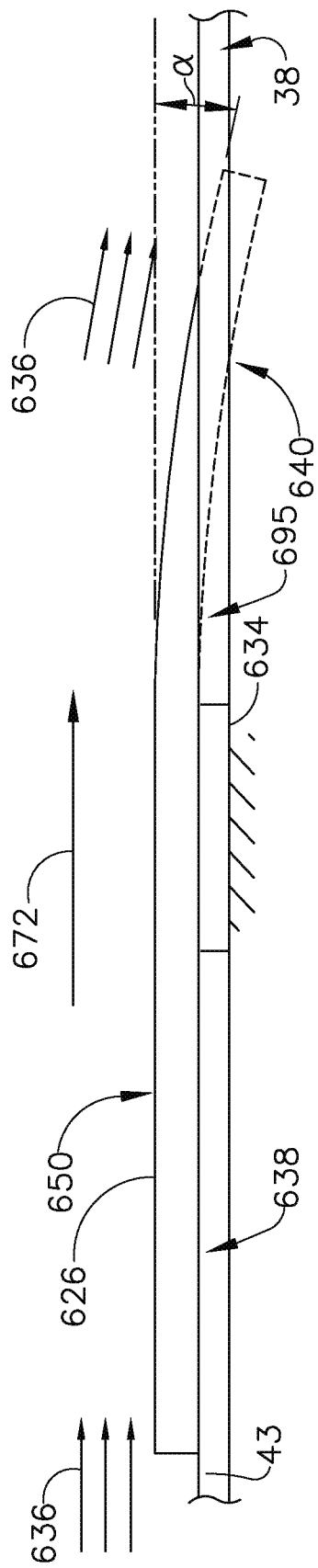

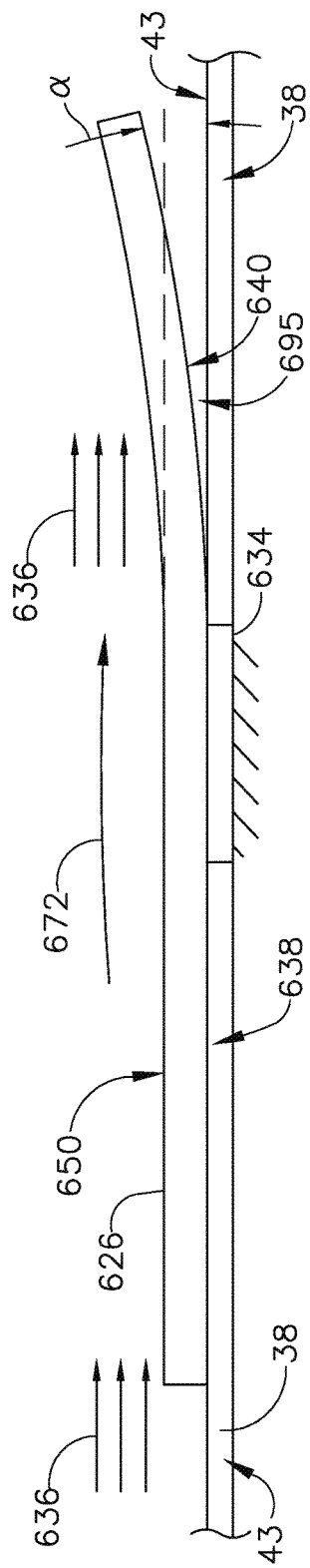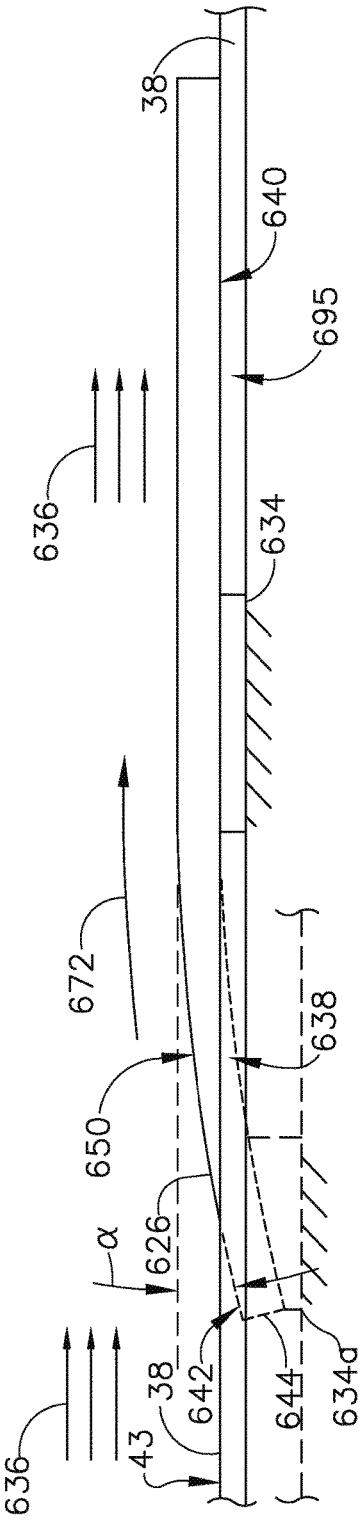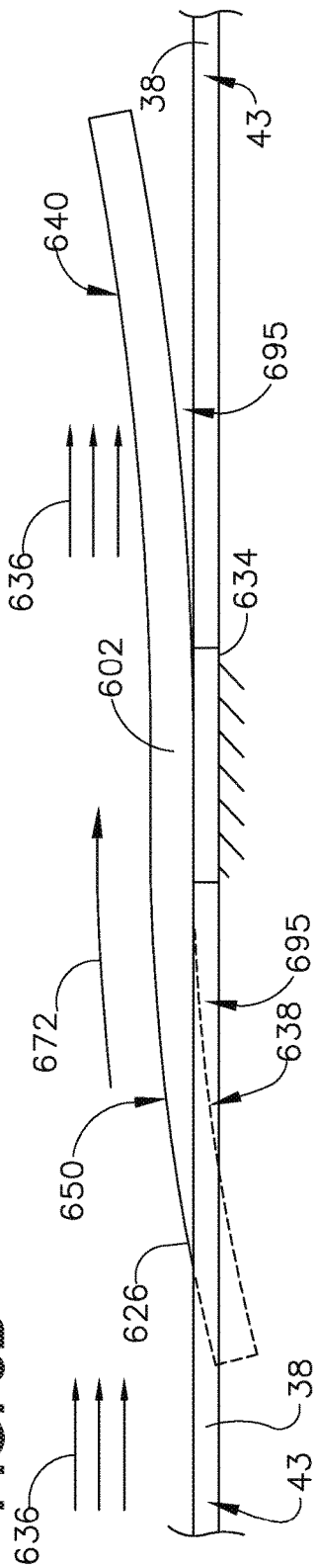

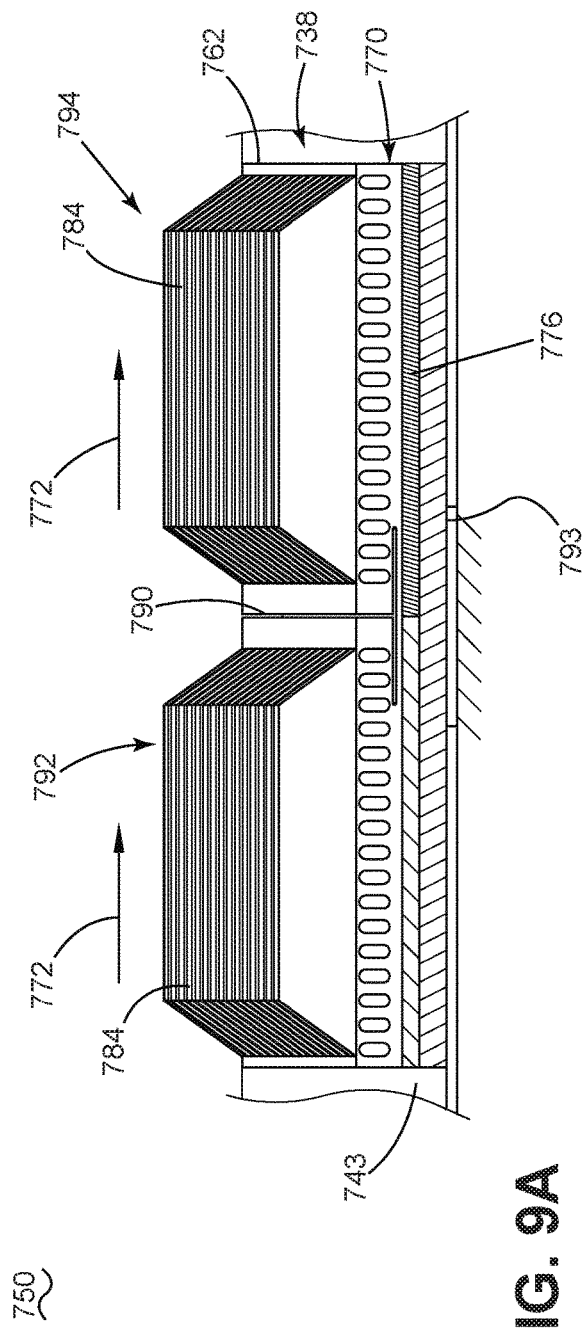
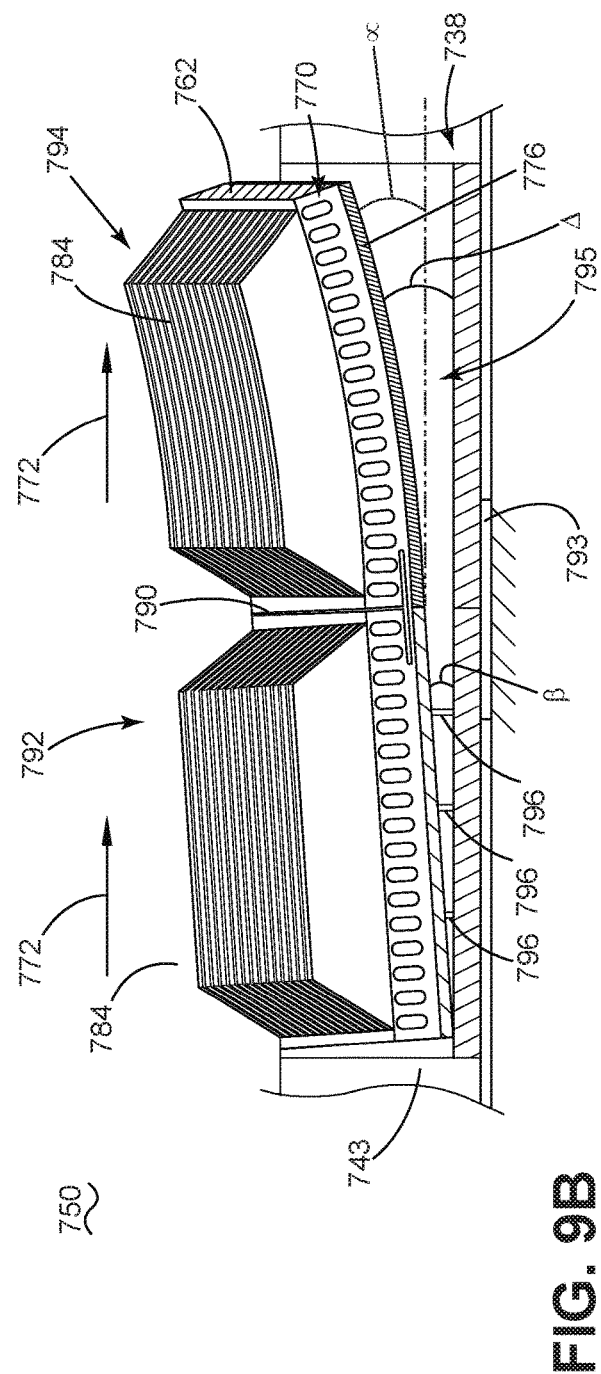
FIG. 9A
FIG. 9B

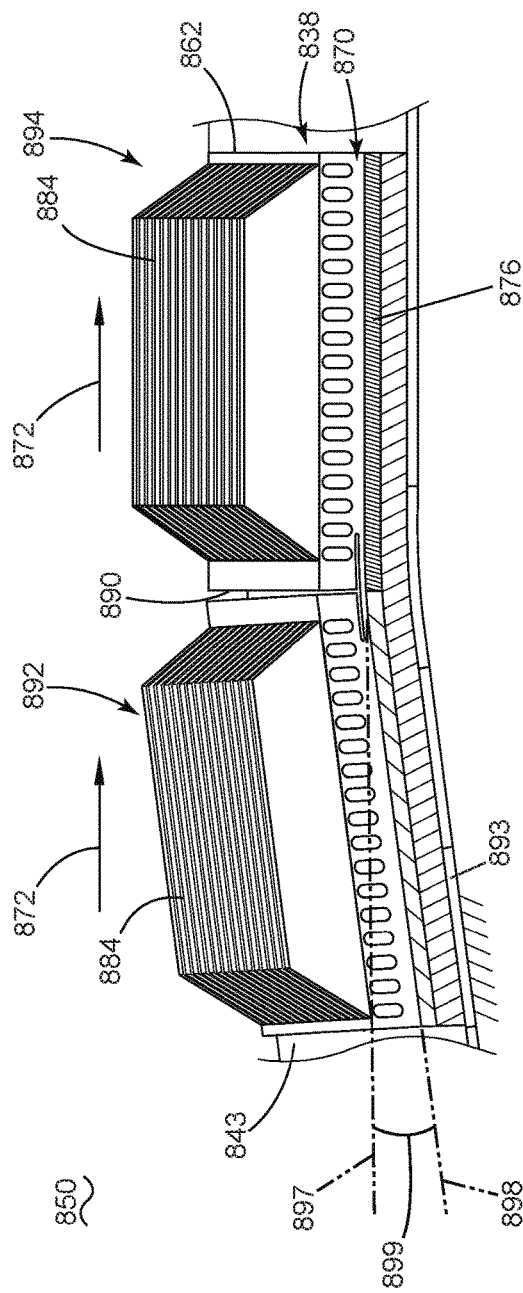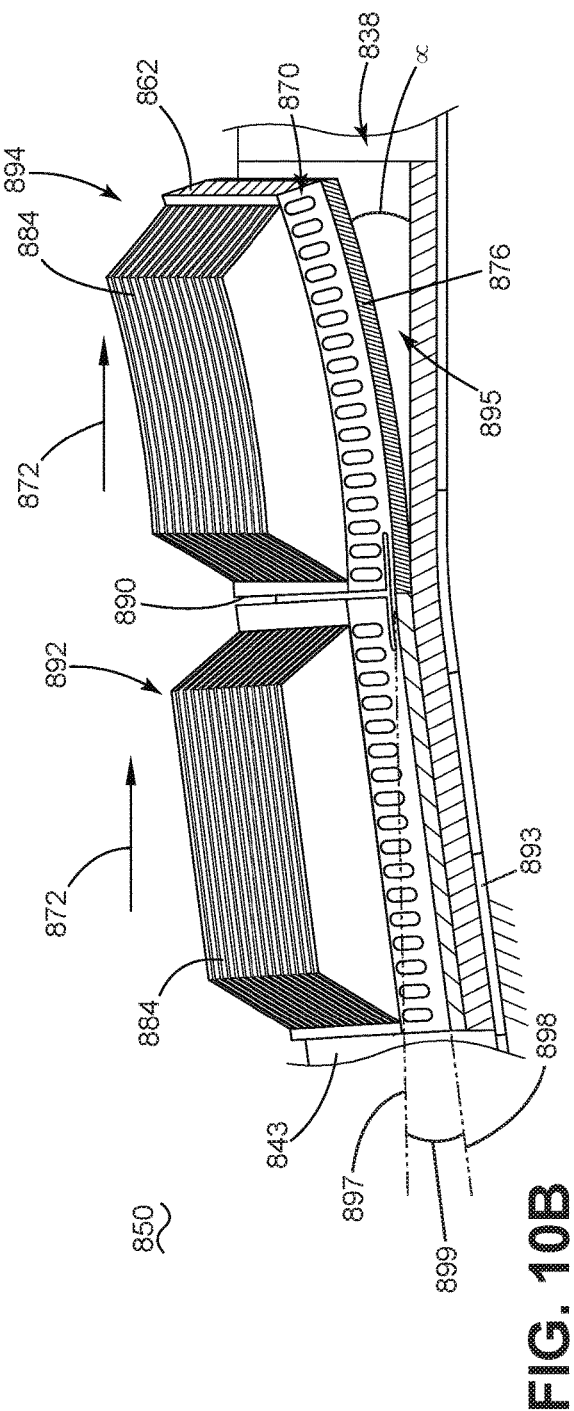

FAN CASING ASSEMBLY WITH COOLER AND METHOD OF MOVING

CROSS REFERENCE TO RELATED APPLICATION

This application is a continuation-in-part of U.S. application Ser. No. 15/252,718, filed Aug. 31, 2016, which is incorporated herein by reference in its entirety.

BACKGROUND OF THE INVENTION

Contemporary engines used in aircraft produce substantial amounts of heat that must be transferred away from the engine in one way or another. Heat exchangers provide a way to transfer heat away from such engines. For example, heat exchangers can be arranged in a ring about a portion of the engine.

Oil can be used to dissipate heat from engine components, such as engine bearings, electrical generators, and the like. Heat is typically transferred from the oil to air by air-cooled oil coolers, and more particularly, surface air-cooled oil cooler systems to maintain oil temperatures at a desired range from approximately 100° F. to 300° F. In many instances, an environment can be as low as −65° F.

Heat exchangers such as surface air-cooled oil coolers can be placed in a turbine jet engine fan case, using bypass air to remove lube oil energy through forced convection. The coolers can include a plurality of fins through which to achieve the forced convection. The fin geometry and height with respect to the airflow velocity are critical parameters for the transfer of energy and are sized for a maximum engine load. During non-peak demand conditions, the cooler is thermally oversized and is not optimized to minimize aerodynamic drag.

BRIEF DESCRIPTION OF THE INVENTION

In one aspect, the present disclosure relates to a fan casing assembly including an annular fan casing having a peripheral wall. The fan casing assembly includes a fan casing cooler having a body with a first surface confronting the peripheral wall, a second surface opposite the first surface, and at least one conduit configured to carry a flow of heating fluid proximal to the second surface. The body is arranged to transfer heat from the heating fluid to air flowing through the annular fan casing. The body includes at least one thermally sensitive portion configured to passively position at least a portion of the fan casing cooler into the air flowing through the annular fan casing in response to a change in a thermal condition.

In another aspect, the present disclosure relates to a fan casing cooler for an aircraft engine having a bypass duct. The fan casing cooler includes a heat exchanger body including a first surface, a second surface opposite the first surface, and at least one conduit configured to carry a flow of heating fluid proximal to the second surface, the body being arranged to transfer heat from the heated fluid to air flowing through the bypass duct and where the body includes at least one thermally sensitive portion configured to change shape in response to a change in a thermal condition.

In yet another aspect, the present disclosure relates to a method of moving an air-cooled oil cooler within a bypass fan duct of an aircraft engine. The method includes positioning the air-cooled oil cooler in the bypass fan duct when a first reference temperature is reached. The positioning is a passive positioning and includes a thermally sensitive portion of the air-cooled oil cooler changing shape in response to a change in a thermal condition.

BRIEF DESCRIPTION OF THE DRAWINGS

In the drawings:

FIGS. 8A-8E are schematic, side views of the cooler of FIG. 7 illustrating different contours shapes for the flat, inset casing cooler.

FIG. 9A is a perspective view of a cooler having a thermally sensitive portion on a downstream portion of the cooler.

FIG. 9B is a perspective view of the cooler of FIG. 9A with an upstream portion mechanically actuated and the downstream portion thermally actuated.

FIG. 10A is a perspective view of a cooler having an angled upstream portion and a thermally sensitive portion on a downstream portion of the cooler.

FIG. 10B is a perspective view of the cooler of FIG. 10A with the downstream portion thermally actuated.

DESCRIPTION OF EMBODIMENTS OF THE INVENTION

Embodiments disclosed herein relate to a fan casing cooler, such as a surface air-cooled oil cooler, and more particularly to passively positionable surface coolers in an engine such as an aircraft engine. The exemplary surface coolers can be used for providing efficient cooling. Further, the term "surface coolers" as used herein can be used interchangeably with the term "heat exchangers." As used herein, the surface coolers are applicable to various types of applications such as, but not limited to, turbojets, turbo fans, turbo propulsion engines, aircraft engines, gas turbines, steam turbines, wind turbines, and water turbines.

Current surface coolers are static structures, typically extending into an airflow path to transfer heat from the surface coolers by means of forced convection. The surface coolers can include a set of fins extending into the airflow path to confront an airflow. The fins geometry with respect to the airflow velocity is critical for determining and maximizing the transfer of energy. The fins are sized for maximum engine load condition during peak demand conditions. During a peak demand condition, engine temperatures are heightened, requiring increased demand for cooling, necessitating enlarged fins to improve cooling. During off-peak conditions, the surface coolers and fins are oversized resulting in unnecessary aerodynamic drag, leading to increased specific fuel consumption by the engine. Thus, there is a need to adaptively balance cooling performance with drag in order to improve specific fuel consumption while maintaining sufficient transfer of energy by the surface cooler during peak demand conditions.

Figure 1:
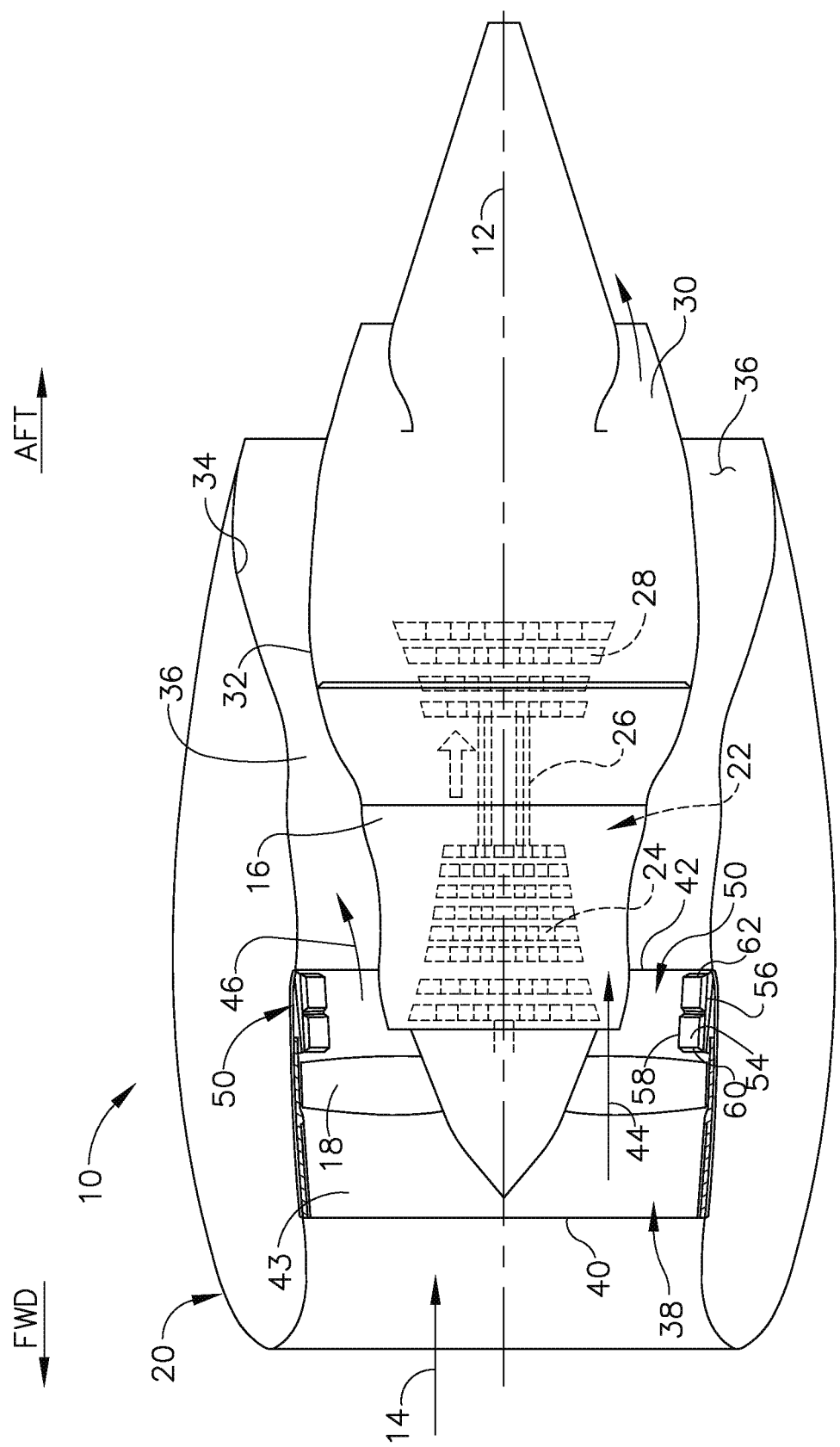
FIG. 1 is a schematic partially cut away view of a turbine engine assembly with a cooler along an annular fan casing.

Aspects of the present disclosure have an improved design that result in optimized engine cooling while reducing drag, which improves specific fuel consumption. As the surface cooler can be configured for use in an oil cooling system of an aircraft engine, FIG. 1 provides a brief explanation of an exemplary environment. More specifically, FIG. 1 illustrates an exemplary turbine engine assembly 10 having a longitudinal axis 12. A flow path 14 can be defined along the longitudinal axis 12. A turbine engine 16, a fan assembly 18, and a nacelle 20 can be included in the turbine engine assembly 10. The turbine engine 16 can include an engine core 22 having compressor(s) 24, a combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 can be a bypass duct, permitting a portion an airflow along the flow path 14 to bypass the engine core 22. The annular passage 36 characterizes, forms, or otherwise defines a nozzle and a generally forward-to-aft bypass airflow path. An annular fan casing assembly 38 having an annular forward casing 40 and an aft casing 42 with the annular fan casing having a peripheral wall 43 to form a portion of the outer cowl 34 formed by the nacelle 20 or can be suspended from portions of the nacelle 20 via struts (not shown).

In operation, air flows through the fan assembly 18 along the flow path 14 and separates into a first portion 44 and a second portion 46 of air. The first portion of the airflow 44 is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass the second portion 46 of the airflow discharged from fan assembly 18 around engine core 22.

The turbine engine assembly 10 can pose unique thermal management challenges and a heat exchanger system including a surface air-cooled oil cooler such as a fan casing cooler 50 (hereinafter 'cooler'), or cooler assembly, can be attached to the turbine engine assembly 10 to aid in the dissipation of heat. Such an example can include a heat exchanger in a non-limiting example. In the illustrated example, the cooler 50 includes a first surface 52 (FIG. 2) confronting the peripheral wall 43 and a second surface 54, opposite the first surface 52, confronting peripheral wall 43 of the annular passage 36. The cooler 50 can mount to the peripheral wall 43 to position the cooler within the second portion of air 46 in the fan casing flow path. The cooler 50 further includes a first end 56 spaced from a second end 58, and opposing forward and aft edges 60, 62. The forward or aft edges 60, 62 can be operably coupled to the peripheral wall 43 of the annular fan casing 38. Alternatively, the cooler 50 can couple to the peripheral wall 43 along any portion of the first surface 52 (FIG. 2).

The cooler 50 can be any suitable cooler or heat exchanger, including the exemplary air-cooled oil cooler. While the coolers 50 are illustrated near the aft casing 42, it should be understood that the coolers 50 can be positioned anywhere along the fan casing 38. It is further contemplated that the coolers 50 can be positioned anywhere along the interior of the outer cowl 34 or the exterior of the inner cowl 32 to confront the second portion of the airflow 48 passing through the annular passage 36. Thus, the cooler 50 can couple to the engine assembly 10 at any position along the annular passage 36 defined by the cowls 32, 34.

Figure 2:
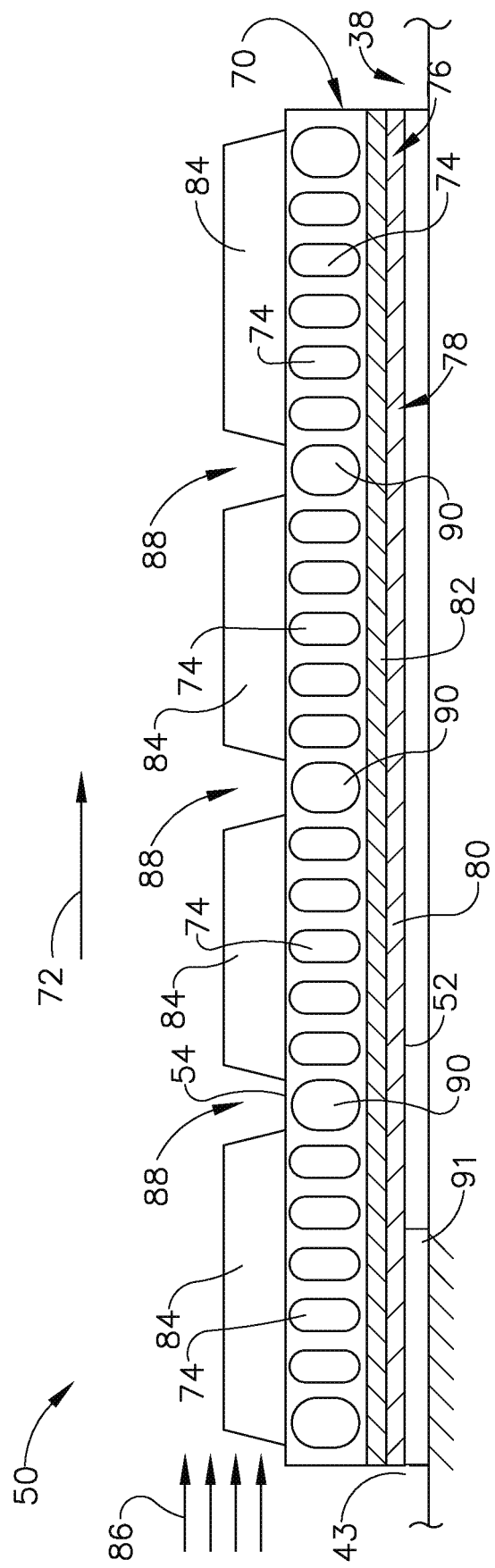
FIG. 2 is a cross-sectional view of the cooler of FIG. 1 including a body with a set of metal layers and four sets of fins.

FIG. 2 illustrates one exemplary cooler 50 that can be utilized in the turbine engine assembly 10, and can be the cooler 50 of FIG. 1, for example. The cooler 50 includes a body 70. The body 70 includes the first and second surfaces 52, 54. The first surface 52 is illustrated as confronting the peripheral wall 43.

At least one conduit 74 is formed in the body 70. The conduit 74 for example, can be a single conduit spanning the area of the cooler 50. In another example, the conduit 74 can be a plurality of conduits extending through the body 70. In yet another example, the conduit 74 can be a single conduit defined in a serpentine path through the body 70. It should be understood that any organization of one or more conduits 74 are contemplated, and that the number of conduits 74 does not limit the cooler 50. The conduits 74 are configured to carry a flow of heated fluid proximal to the second surface 54. The flow of heated fluid, for example can be a flow heated of oil or bypass air that is routed to the cooler 50 for cooling.

A thermally sensitive portion 76 is included with the body 70. The thermally sensitive portion 76 can form a portion of the body 70 and can form the first surface 52 or be proximal to the first surface 52. The thermally sensitive portion 76 is configured to passively position at least a portion of the cooler 50 into the air flowing through the annular fan casing 38, in response to a change in a thermal condition. The body 70 or the thermally sensitive portion 76 can include a set of metal layers 78. The set of metal layers 78 can include a first layer 80 and a second layer 82. The first layer 80 can form the first surface 52, and can be proximal to the fan casing assembly 38 or peripheral wall 43. The thermally sensitive portion is configured to change shape in response to a change in a thermal condition, such as a change in temperature.

The set of metal layers 78 in general, or the first or second layer 80, 82 respectively can be responsive to a change in a thermal condition. A thermal condition, for example, can be a change in temperature. The first and second layers 80, 82, for example, can be made of aluminum alloy and aluminum silicon carbide (AlSiC), respectively. In another example, the metal layers 78 can include additional or alternative layers of nickel titanium (Ni—Ti) shape memory foils or other metal matrix composites (MMC). Additionally, the body 70 can be made of the set of metal layers 78 including the aluminum alloy and the aluminum silicon carbide.

The set of metal layers 78 can have multiple separate layers, having any number of layers combined to form the plates thermally sensitive portion 76, such as a composite metal sheet, having multiple, layered materials. Custom metal material tapes can also be utilized. The thermally sensitive portion 76 including the layers 80, 82 can at least partially deform based upon a change in thermal condition, such as an increase or decrease in temperature. In one example, the thermally sensitive portion 76 can be a bi-metal or shape-memory alloy plate. Under such an example, the thermal activation of the thermally sensitive portion 76 can be tuned by appropriate coefficient of thermal expansion material selection and sizing of directly bonded aluminum alloy and aluminum metal matrix composite (MMC), aluminum silicon carbide sheets (AlSiC).

By way of further non-limiting example, the first layer 80 can include a malleable material, capable of deformation and reformation, and the second layer 82 can include a thermally sensitive material extending along the length of the first layer 80 that deforms relative to a change in temperature. The layers 80, 82 can be continuous or discontinuous, extending wholly or partially along the body 70. The discontinuous layers can be discretely placed on the body 70, in order to particularly determine the geometric change in shape of the thermally sensitive portion 76. With the discrete layers, the cooler 50 can locally change shape based upon a change in temperature, while maintaining the shape of the cooler 50 at areas without the discrete layers or without a change in temperature.

Ultrasonic additive manufacturing (UAM) or additive metal deposition, or other alternative metal bonding/deposition processes in non-limiting examples, can be used to laminate the dissimilar materials to produce a monolithic laminate composite metal sheet formed from the layers 80, 82. The first and second layers 80, 82 can include, but are not limited to, a high strength aluminum alloy and AlSiC. Any suitable materials can be utilized and such material selection creates the temperature dependent internal differential stain. The volume fraction percentage of silicon carbide (SiC) within the AlSiC can be varied to tune the coefficient of thermal expansion (CTE). Depending on the percentage of SiC, the CTE for AlSiC can vary from 7 to 20 ppm/C, while additional percentages are contemplated from 5 to 35 ppm/C. Such as design can cause actuation, translation, or deformation of the thermally sensitive portion 76 relative to change in the thermal condition, and more particularly, increases or decreases in temperature. Further still, binary and ternary Ni—Ti shape memory foils can be incorporated as an additional thermal actuation material or in conjunction with MMC foils. These alloys are designed to activate and change shape at specific tunable temperatures. Such shapes can be particularly created based upon the tuning of local percentages of the SiC throughout the layers 80, 82, for example, or other shape memory alloy materials.

The alloys and smart metals used can be additively fabricated, such as using the UAM process or additive electroforming, providing for low mass as well as optimization for maximum cooling of the cooler 50. Furthermore, the addition of complex 3D printed kinematic features is possible using a combination of in-situ machining, layered ultrasonic welding, and secondary laser welding.

The body 70 can further include fins 84. The fins 84 are formed on the second surface 54, opposite the first surface 52. The fins 84 can include elongated, continuous fins, segmented fins, or a plurality of discrete fins, as well as continuous fin segments. The fins 84 extend into the airflow 72 such that a portion 86 of the airflow 72 can pass through the fins 84. Sets of fins 84 can be spaced from one another to define channels 88 between the sets of fins adjacent fins 84. The channel 88 of the cooler 50 can form a partial hinge, or the hinge 90 can be formed in the body 70. The hinges 90 formed in the body 70 can be adjacent the channel 88

The body 70 is arranged to transfer heat from the heated fluid to air or an airflow 72 flowing through the annular fan casing 38. The heated fluid can be passed through the conduits 74 transferring the heat to the fins 84 and the second surface 54. The airflow 72, for example, can be the air flowing along the flow path 14 of FIG. 1, or can be the second portion 46 of the airflow passing through the annular fan casing 38. Convection of the airflow 72 along the fins 84 and the second surface 54 transfers the heat from the heated fluid to cool the fluid.

The cooler 50 can mount to the fan casing 38 at the peripheral wall 43 with a mount 91. The mount 91 can position the cooler 50 into the airflow 72 path, while permitting flexion of the thermally sensitive portion 76 without contacting the peripheral wall 43. The mount 91, for example, can be a bracket. The bracket can be nodal or stationary, at preferred locations in order to be compliant to the translating movement of the thermally sensitive portion 76. Additionally, it is contemplated that the mount 91 can include a rotational hinge or flexure to allow for greater or more determinative movement of the cooler 50 relative to the fan casing 38.

Figure 3A:
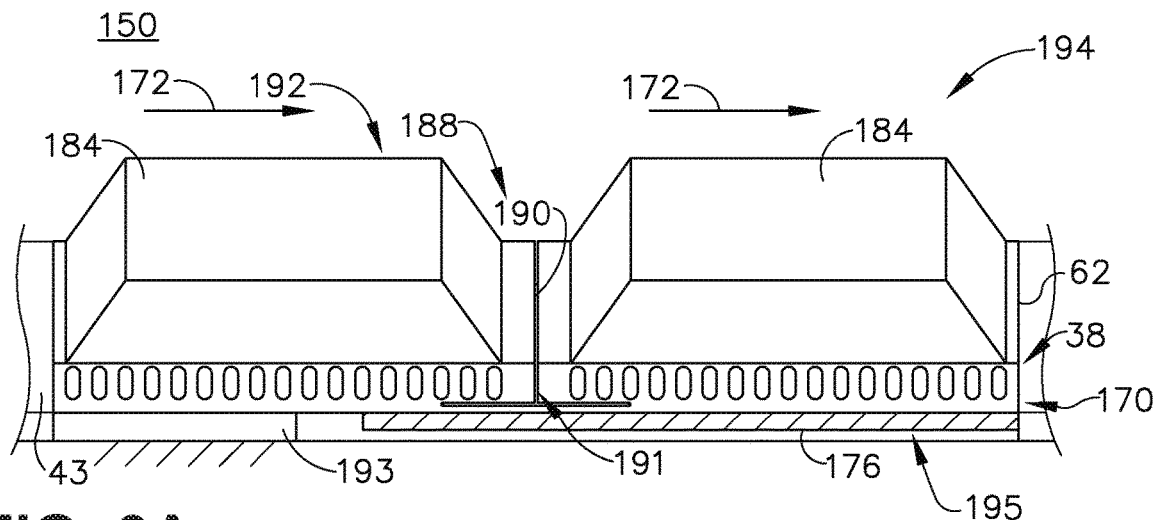
FIG. 3A is a perspective view of the cooler of FIG. 1 with the set of metal layers disposed along an aft portion of the cooler, with the cooler in a first, initial position.
Figure 3B:
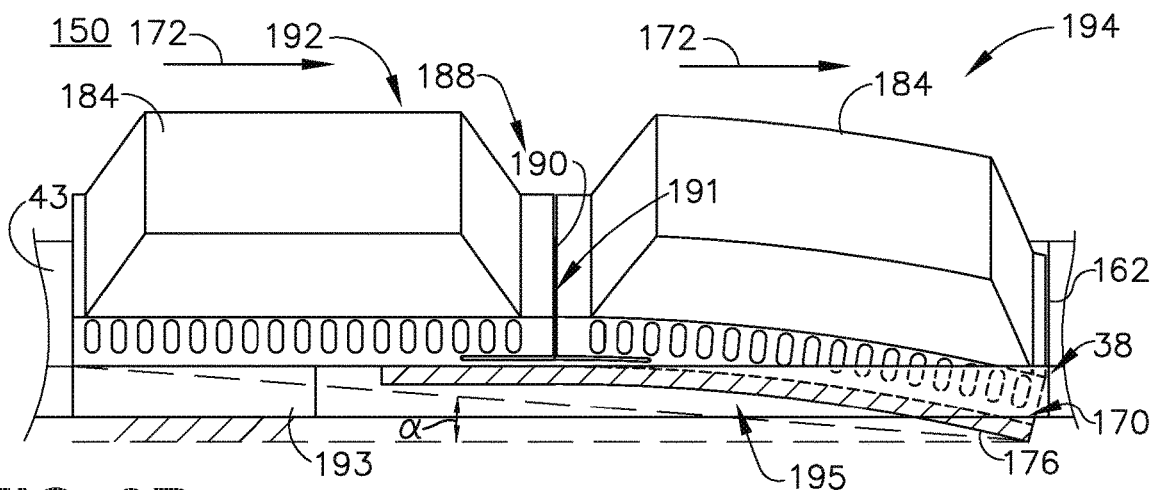
FIG. 3B is a perspective view of the cooler of FIG. 3A translated to a retracted position.
Figure 3C:
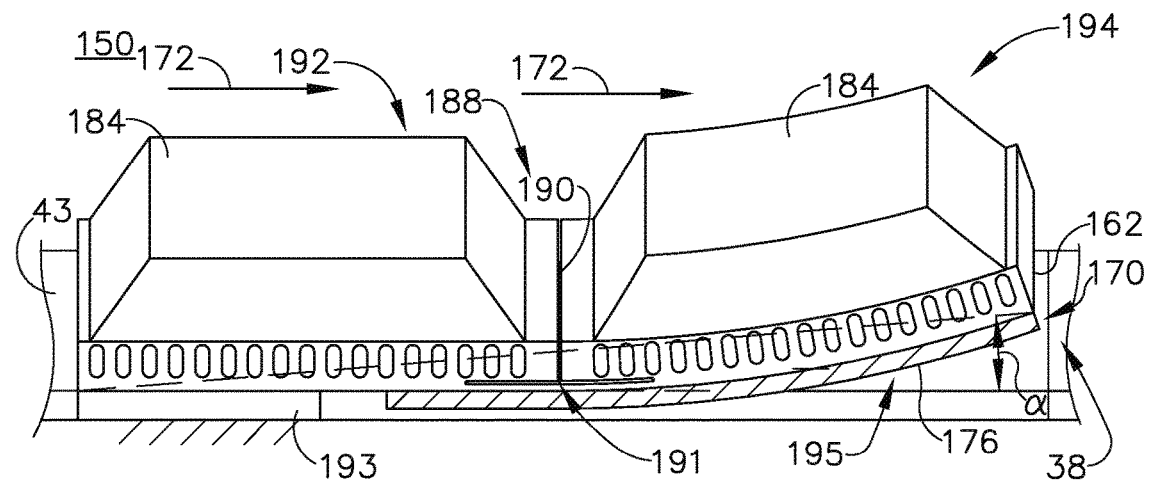
FIG. 3C is a perspective view of the cooler of FIG. 3A translated to a deployed position.

Referring now to FIGS. 3A-3C, a side view of an exemplary cooler 150 is illustrated in an initial position, a deployed position, and a retracted position. The cooler 150 of FIGS. 3A-3C can be substantially similar to the cooler 50 of FIG. 2. As such, similar numerals will be used identify similar elements increased by a value of one hundred.

Referring to FIG. 3A, the cooler 150 is illustrated in the initial position, with the body 170 having a linear arrangement, such as parallel to or substantially parallel to the horizontal axis of the engine or the airflow 172 passing along the cooler 150. The cooler 150 has been illustrated as including only a single hinge 190. The hinge 190 includes a 't-shaped' slot 191 extending circumferentially along the cooler 150. The hinge 190 is a flexural, rotational hinge incorporated into the body 170 to assist and partially define the flexion of the body 170 during kinematic motion. The hinge 190 is illustrated as being located between adjacent, axial sets of fins 184.

A forward section 192 and an aft section 194 of the cooler 150 can be defined on either side of the hinge 190, the channel 188, or the axially arranged sets of fins 184. Alternatively, the forward and aft sections 192, 194 can be defined as an axial division of the cooler 150. The forward or aft sections 192, 194 can be coupled to the peripheral wall 43 (FIG. 1) of the annular fan casing 38 (FIG. 1) at the thermally sensitive portion or along the body 170. The thermally sensitive portion 176 is disposed underneath the aft section 194 and partially under the forward section 192. As such, the thermally sensitive portion 176 can align with the aft edge 162.

A mount 193 can be used to mount the cooler 150 to the fan casing assembly 38. The mount 193 can position the cooler 150 above the fan casing assembly 38, to define a gap 195 below the cooler 150. The cooler 150 can actuate or flex about the mount 193.

Referring to FIG. 3B, the cooler 150 responds to a thermal condition, such as a decrease in temperature, moving the aft section 194 into the retracted position further from the airflow 172 and at least partially into the gap 195. In the retracted position, the fins 184 or other portions of the cooler 150 can extend below the surface of the peripheral wall 43 to minimize the surface area of the cooler 150 disposed in the airflow 172. As such, any aerodynamic drag on the aft section 194 or the fins 184 is minimized. In the retracted position as shown, the cooler 150 can be shaped to defined an angle of attack α relative to the horizontal engine axis 12 transposed along the bottom of the cooler 150, or relative to an axis parallel to the streamline flow 14 through the engine 10 (FIG. 1). In the retracted position, the angle of attack α can be negative, such as between −5 degrees to −35 degrees in one non-limiting example. The negative value for the angle of attack α represents disposition away from the airflow 172. In this position, aerodynamic drag is minimized, while cooling effectiveness of the cooler 150 is also minimized. It should be understood that the retracted position can be resultant of a thermal condition during an off-peak demand condition, such as minimized operational temperatures for the engine.

Referring to FIG. 3C, the cooler 150 responds to a thermal condition, such as an increase in temperature. The thermally sensitive portion 176 can actuate or move, translating the aft section 194 into the deployed position confronting a greater volume of the airflow 172. In the deployed position, the aft section 194 is disposed at a positive angle of attack α, such as between 5 degrees to 35 degrees, in on non-limiting example. The positive value for the angle of attack α represents disposition into the airflow 172.

In the deployed position, the cooler 150 is shaped to have a larger surface area confronting the airflow 172, increasing aerodynamic drag and cooling effectiveness at the fins 184. The body 170 can be configured to increase the angle of attack α of the fins 184 in response to the change in thermal condition.

The difference between the first position (FIG. 3A) and the retracted or deployed positions (FIGS. 3B-3C) can be represented by the angle of attack α. The thermally sensitive portion 176 can curve or define a curvilinear profile to translate a portion of the cooler 150 into or out of the airflow 172. Such a curvature can orient the thermally sensitive portion 176 at the angle of attack α. The angle of attack α can be between 0-degrees and 10-degrees, and can be 5-degrees in one non-limiting example for a typical cooler 150. The angle of attack α can provide an angled orientation to orient the arranged fins 184 at different radial lengths to confront a greater area and volume of the airflow 172. As such, cooling effectiveness of the cooler 150 is increased.

It should be appreciated that while the cooler 150 is in the retracted or deployed position, the aerodynamic drag caused by the cooler 150 increases or decreases as compared to the aerodynamic drag caused by the cooler 150 in the first position (FIG. 3A). As such, the thermal condition can be used to balance a need for cooling by the cooler 150 while minimizing aerodynamic drag when less cooling is needed to maximize fuel efficiency. It should further be appreciated that the deployed position can be resultant of a thermal condition during a peak demand condition, such as heightened operational temperatures.

Because the thermally sensitive portion 176 curves based on thermal conditions the cooler 150 can passively translate based upon the thermal condition in order to balance the cooling need with minimized aerodynamic drag. The thermally sensitive portion 176, for example, can be tailored to translate and rotate the cooler 150 at a particular temperature, such as greater than 200-degrees Fahrenheit, such as a maximum demand temperature for oil cooling, while remaining in an initial position during lesser demand conditions, such as less than 190-degrees Fahrenheit, in non-limiting examples.

The thermal condition and translation of the thermally sensitive portion 176 or cooler 150 can be determined using simple variable or uniform cross-section cantilever plate equations and finite element analysis simulations. Closed-form thermal-strain solutions for bi-metal plates were initially used to approximate thermal actuation deflections. In one non-limiting example, the radius of curvature can be represented by variable cross-section cantilever beam equations, such as equation (1):

$$\rho = \frac{t\left[3(1+m)+(1+mn)\left(m^2+\frac{1}{mn}\right)\right]}{6(\alpha_2-\alpha_1)(T_h-T_c)(1+m)^2} \quad (1)$$

and the angle of rotation can be represented by equation (2):

$$\sin\theta = \frac{L}{2\rho} \quad (2)$$

where ρ is the radius of curvature, t is the total thickness of the actuation component 192, m is the thickness ratio of first material to the second material, n is the elastic modulus ratio between the two materials, $\alpha_2$ is the second coefficient of thermal expansion, $\alpha_1$ is the first coefficient of thermal expansion, $T_h$ is the hot temperature, $T_c$ is the cool temperature, θ is the angle of rotation, and L is the length of the actuation component. Thus, in determining the radius of curvature ρ and the angle of rotation θ, the angle of attack α can be determined using equation (2) based upon the determination the angle of rotation θ for the thermally sensitive portion. Additionally, the angle of rotation θ and the angle of attack α can be tuned based upon the amount of SiC within the AlSiC layer.

As such, based upon a measured temperature by the thermally sensitive portion 176 in FIGS. 3A-3C, a balance can be achieved between a need to maximize cooling at the cooler 150 during high demand conditions with minimizing aerodynamic drag at the cooler 150 during lower demand conditions. Such a balance can be tailored, for example, by the amount of SiC in the AlSiC comprising the thermally sensitive portion 176.

Figure 4:
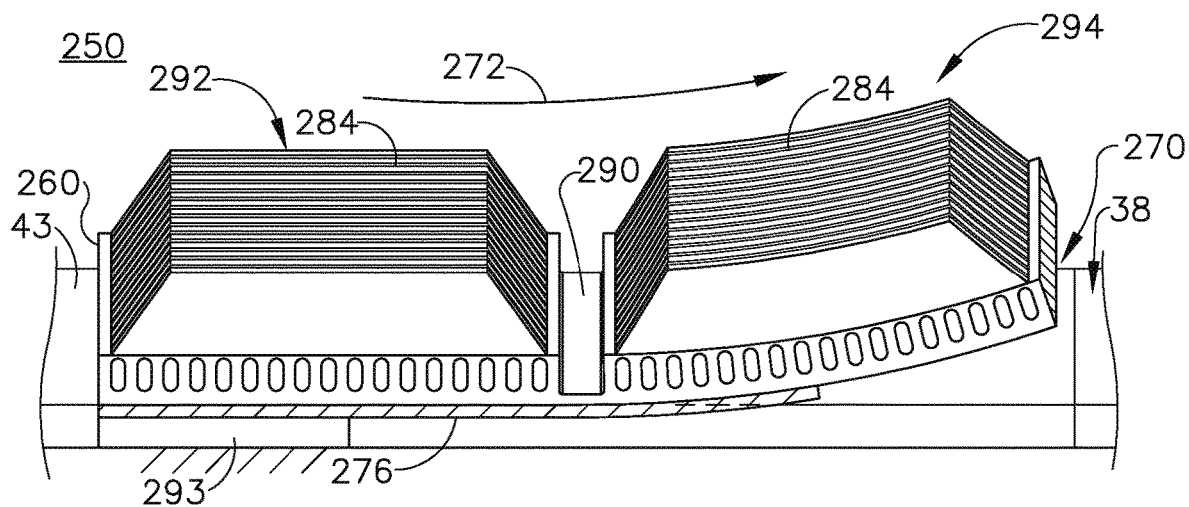
FIG. 4 is a perspective view of the cooler of FIG. 1 having a set of metal layers positioned along a forward portion of the cooler, with a widened hinge between sets of fins.

Referring now to FIG. 4, illustrating another exemplary cooler 250, the thermally sensitive portion 276 can be aligned with the forward edge 260. The elements of FIG. 4 can be substantially similar to those of FIGS. 3A-3C. As such, similar numerals will be used to identify similar elements increased by a value of 100. The thermally sensitive portion 276, for example, can include a greater amount of SiC near the aft section 294, in order to translate the aft section into the airflow 272, while the amount of SiC at the forward section 292 is minimal to keep the forward section 292 from blocking the airflow to the aft section 294. The hinge 290 can be formed as a channel in the body 270, extending in the circumferential or tangential direction. The channel can be different from the 't-shaped' hinge 190 of FIGS. 3A-3C. The channel-shaped hinge 290 can provide for increased bending of the body 270 to accommodate translation of the cooler 250 by the thermally sensitive portion 276.

It should be appreciated that while the mount 293 is disposed adjacent the forward edge 260, it can be positioned anywhere axially along the cooler 250 enabling differing or unique shaping of the cooler 250 based upon actuation of the thermally sensitive portion 276.

Figure 5A:
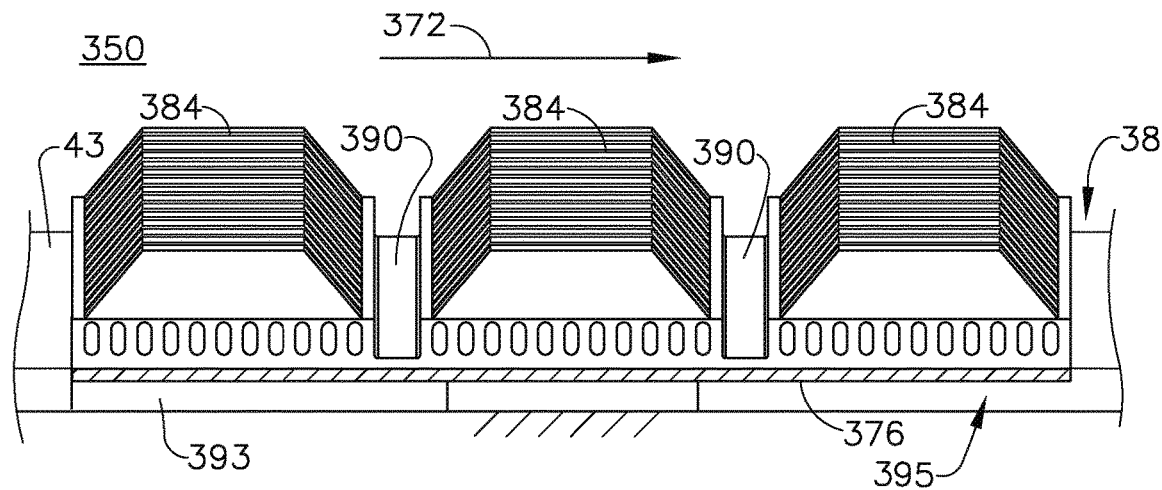
FIG. 5A is a perspective view of the cooler of FIG. 1 having three sets of fins with a set of metal layers extending along the entirety of the cooler.
Figure 5B:
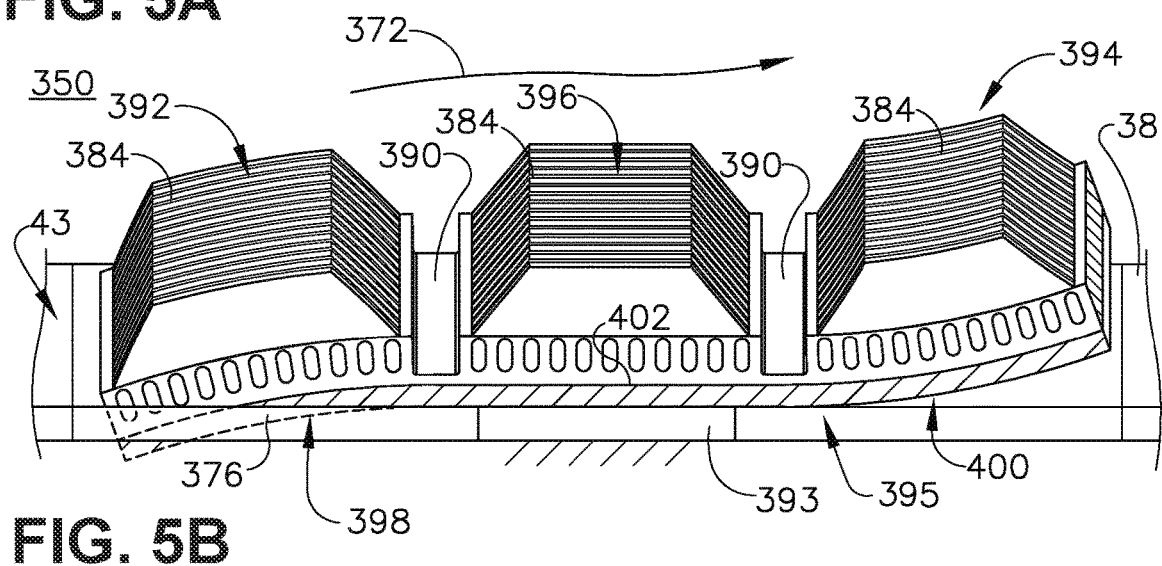
FIG. 5B is a perspective view of the cooler of FIG. 5A having a convex curve and a concave curve.

Referring now to FIGS. 5A-5B, another exemplary cooler 350 is illustrated. As FIGS. 5A-5B are substantially similar to FIG. 4, similar numerals will be used to identify similar elements increased by a value of 100. In FIG. 5A, the fins 384 can be arranged into three axially arranged sets of fins 384, with a plurality of fins 384 extending in the circumferential direction. The fins 384 are spaced from one another to permit a volume of the airflow 372 to pass between the fins 84. Hinges 390 can be disposed between the adjacent sets of fins 384 to facilitate translation of the cooler 350 by the thermally sensitive portion 376. The hinges 390 can be a channel extending in the circumferential direction, while any shape or orientation for the hinges 390 is contemplated, such as the 't-shaped' hinge of FIGS. 3A-3C. The thermally sensitive portion 376 extends along the entirety of the cooler 350 from forward to aft. As such, discrete amounts of SiC can be used to particularly tailor the translated shape of the thermally sensitive portion 376. As illustrated, the cooler 350 is in the initial position, similar to that of FIG. 3A. The mount 393 is positioned in the axially-center portion of the cooler 350, however any position is contemplated.

Referring now to FIG. 5B, one example illustrates the cooler 350 translated in to a deployed position with the mount 393 located at the axial center of the cooler 350. The thermally sensitive portion 376 can include discrete materials to discretely define the shape or contour for the cooler 350. A center section 396 is disposed between the forward and aft sections 392, 394. The center section 396 can be operably coupled to the peripheral wall 43 of the annular fan casing 38 at the mount 393. A concave curve 398 can be defined along the thermally sensitive portion 76 and a convex curve 400, having an inflection point 402 between the curves 398, 400. The forward portion or forward section 392 can have the concave curve 398 while the aft portion or aft section 394 can include the convex curve 400. The concave curve 398 can position the cooler further into the airflow 372, positioning the fins 384 on the center section 396 radially within the fins 384 on the forward section 392. Thus, the fins 384 on the center section 396 can be oriented to have an increased surface area to confront a greater volume of the airflow 372, not impeded by the fins 384 on the first section 392. Furthermore, the concave curve 400 slightly orients the fins 384 on the forward section 392 toward the incoming airflow 372. While a portion of the cooler 350 is disposed within the peripheral wall 38, the fins 384 are angled to confront a greater volume of the airflow 372. It should be understood that while a portion of the cooler 350 is disposed in the gap 395, the mount 393 can be sized such that no portion of the cooler 350 extends into the gap 395, and remains radially within the peripheral wall 43 in the deployed position.

Additionally, the convex curve 400 positions the fins 384 on the aft section 394 radially within the fins 384 on the center portion 396 to expose the fins 384 on the aft portion 394 to a flow of air 372 not impeded by the forward or center portion 392, 396. It should be appreciated that the deployed position can be resultant of a thermal condition during a peak demand condition, such as heightened operational temperatures.

Figure 6A:
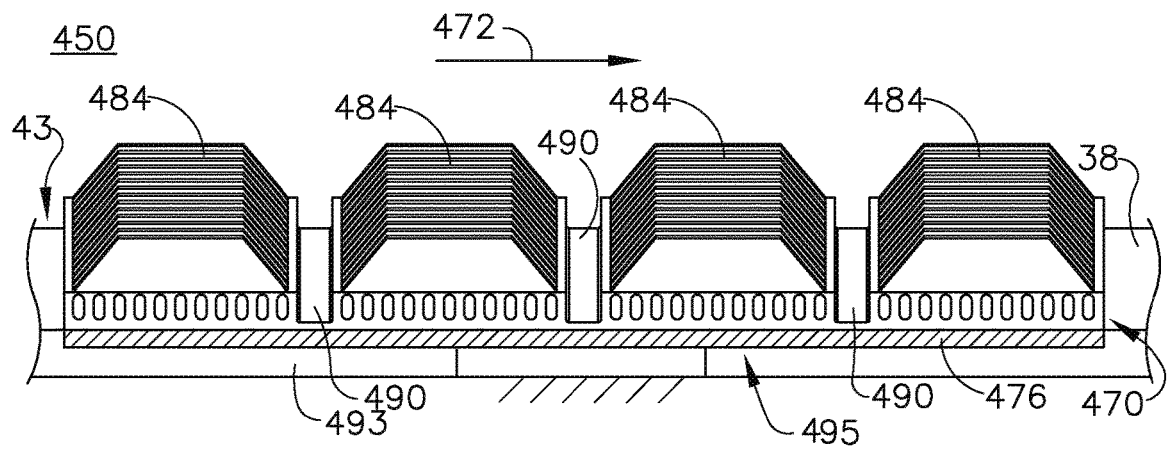
FIG. 6A is a perspective view of the cooler of FIG. 1 having four sets of fins in a first, initial position.
Figure 6B:
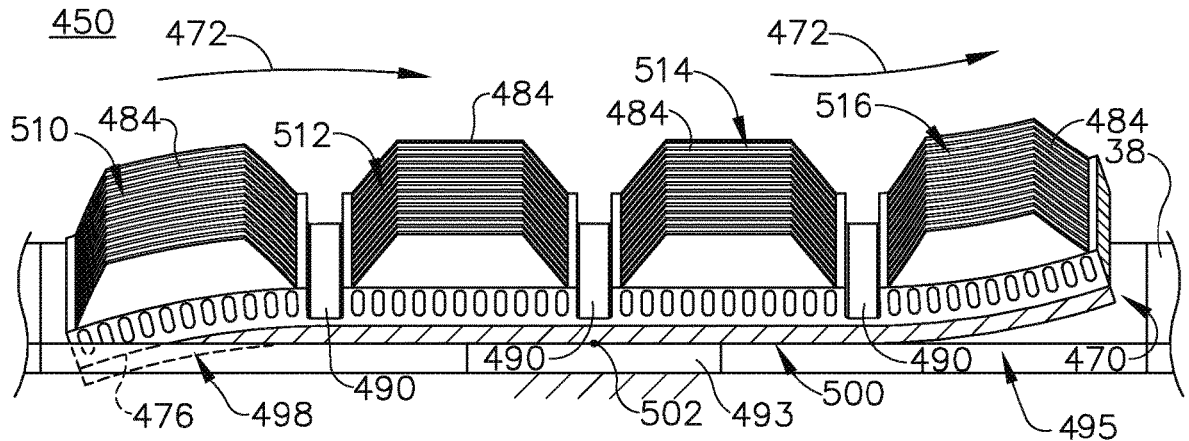
FIG. 6B is a perspective view of the cooler of FIG. 6A in a second position having a convex curve and a concave curve.
Figure 6C:
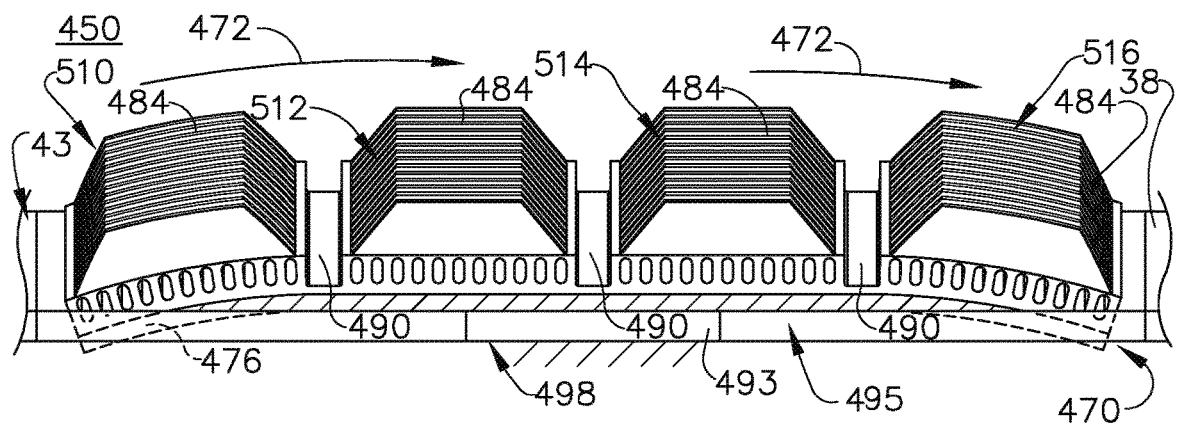
FIG. 6C is a perspective view of the cooler of FIG. 6A in a third position having a convex curve along the length of the cooler.

Referring now to FIGS. 6A-6C, another exemplary cooler 450 is illustrated having four sets of fins 484. The examples shown in FIGS. 6A-6C can be substantially similar to those shown in FIGS. 5A-5B. As such, similar numerals will be used to identify similar elements increased by a value of 100. Referring to FIG. 6A in particular, the cooler 450 includes four sets of fins 484, having hinges 490 disposed between each set of fins 484. The cooler 450 is disposed in the initial position, having the thermally sensitive portion 476 in a linear position, such as parallel to the engine centerline or the flow path of the airflow 472 in non-limiting examples. The mount 493 is disposed at the axial center of the cooler 450, while any position is contemplated.

In FIG. 6B, illustrating the cooler 450 in a deployed position, the body 470 can be separated into a forward edge portion 510, a forward center portion 512, an aft center portion 514, and an aft edge portion 516. The concave curve 498 can extend between the forward edge portion 510 and the forward center portion 512. The convex curve 500 can extend between the aft center portion 514 and the aft edge portion 516. The inflection point 502 is positioned in the axial center of the cooler 450. It should be understood that the inflection point 502 can be offset from the axial center of the cooler 450, having one of the concave curve 498 or the convex curve 500 longer than the other in the axial direction along the airflow 472. Such a shape or contour can be defined by the discrete positioning of SiC in the AlSiC of the thermally sensitive portion, for example. As illustrated, the curvature of FIG. 6B can be a deployed position that occurs with the change in thermal condition such as an increase in temperature. In the deployed position, the fins 484 will confront a larger surface area and volume of the airflow 472, having the concave curve 498 orienting the forward portion of the cooler 450 into the peripheral wall 43 and the gap 495, while extending the aft portion of the cooler 450 radially inward, away from the peripheral wall 43 to confront more airflow, unimpeded by the rest of the cooler 450. It should further be appreciated that the deployed position can be resultant of a thermal condition during a peak demand condition, such as heightened operational temperatures.

Turning now to FIG. 6C, illustrating an alternative deployed position to FIG. 6B, it is further contemplated that the concave curve 498 can extend the entirety of the cooler 450, such that a portion, such as the forward center portion 512 can extend further into the airflow 472, while the aft portions 514, 516 are both hidden behind the forward portions 510, 512, relative to the airflow 472 or an axial direction. Thus, it should be appreciated that the cooler 450 can be discretely tailored to shape or contour the body 470 to balance cooling efficiency with aerodynamic drag. The forward and aft portions of the cooler 450 have actuated to extending radially outward, into the fan casing 38 and the peripheral wall 43. In the alternative deployed position, the forward portions 510, 512 can confront a greater volume of the airflow 472, while the aft portions 514, 516 can confront a lesser volume of the airflow 472. As such, it should be appreciated that the thermally sensitive portion 476 can be particularly tailored to the thermal condition or the particular needs to the engine 10 (FIG. 1) to optimize cooling at the cooler 450. A balance between the need for cooling efficiency and aerodynamic efficiency can be passively maintained. It should further be appreciated that the alternative deployed position can be resultant of a thermal condition during an off-peak demand condition, such as heightened operational temperatures, being lower than peak demand temperatures.

It should also be appreciated that the thermally sensitive portion 476 can form an entirety of the concave curve 498, an entirety of the convex curve 500, or only portions of the concave curve 498 and the convex curve 500. The cooler 450 can also include multiple curves 498, 500 having multiple inflection points. As such, it should be appreciated that the thermally sensitive portion 476 can be tailored to particularly orient the body 470 having any shape or contour. Such shapes or contours can be particularly related to discrete thermal conditions, such as differing operational temperatures.

Figure 7:
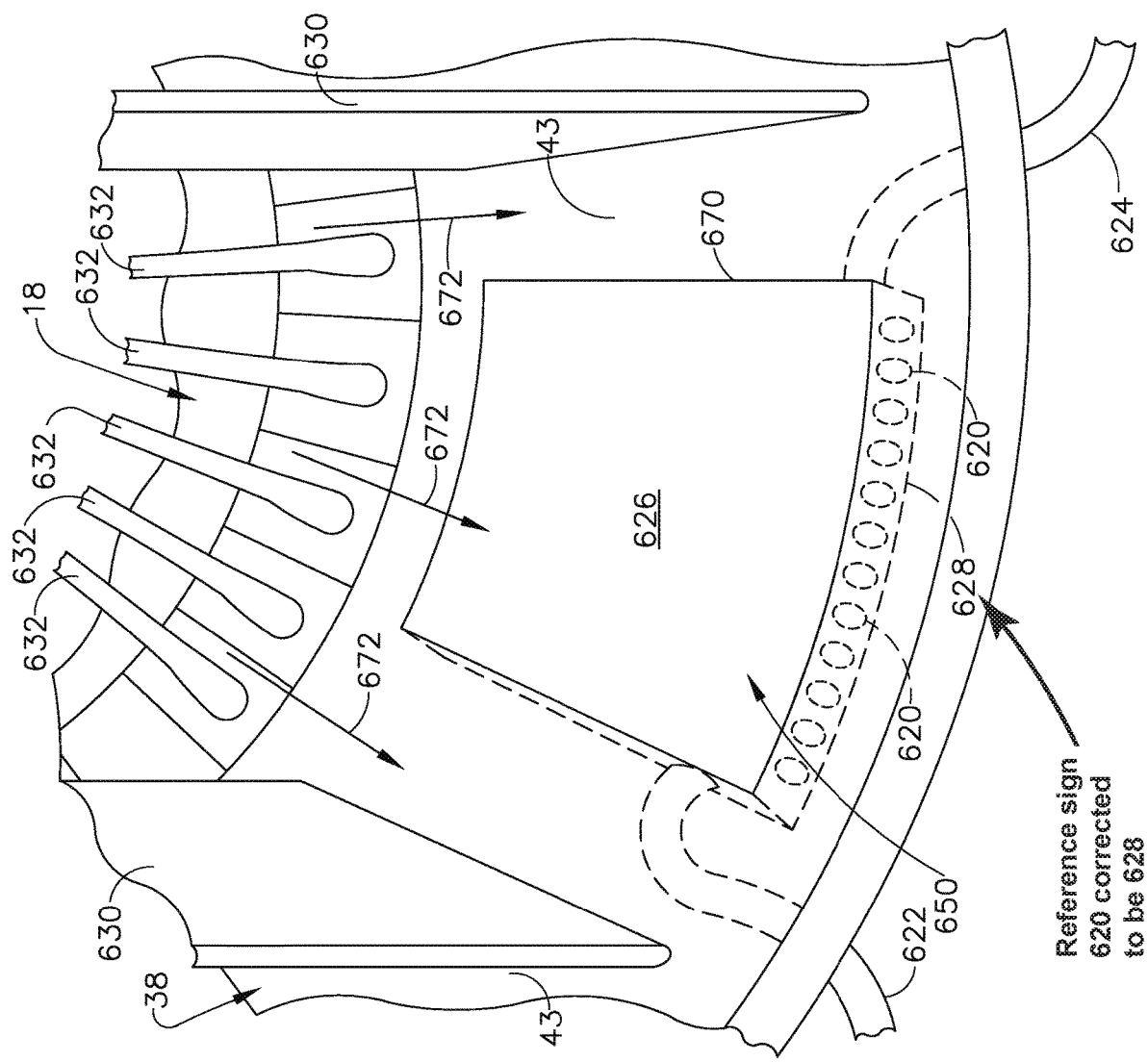
FIG. 7 is a perspective view of an annular passage defined by a fan casing assembly and having a flat, inset casing cooler.

Turning now to FIG. 7, a cooler 650 according to aspects of the disclosure can include a block body 670. While the body 670 is illustrated as a block, any shape is contemplated. It should be appreciated that cooler of FIG. 7 can be substantially similar to the coolers of FIGS. 2-6C, regarding a thermally sensitive material in order to passively actuate the cooler into the airflow path. However, the cooler 650 of FIG. 7 is a plate-type cooler, while the prior coolers in FIGS. 2-6C included fins for improving the convective heat transfers at the cooler. It should be understood that while the fins can improve heat transfer, they also provide for increased aerodynamic drag.

A plurality of conduits 620 can be disposed in the body 670 for providing a volume of fluid, such as oil, through the body 670. An inlet conduit 622 and an outlet conduit 624 can couple to the body 670 providing ingress and egress for the volume of fluid to the plurality of conduits. The cooler 650 can be disposed in the fan casing assembly 38 (FIG. 1). The cooler 650 can include a first surface 626 and a second surface 628. The first surface 626 can be flush with the peripheral wall 43 of the fan casing assembly 38 of FIG. 1, for example.

The cooler 650 can be disposed in the fan casing assembly 38, between two outboard guide vanes 630. The cooler 650 can be disposed downstream, or aft, of a plurality of fan blades 632, such as the blades of the fan assembly 18 of FIG. 1. The fan blades 632 can drive an airflow 672 aft, through the outboard guide vanes 630, and over the cooler 650, such the a portion of the airflow 672 passes along the first surface 626 of the cooler 650.

Referring now to FIGS. 8A-8E, side views of the cooler 650 are illustrated showing different exemplary shapes and contours for the cooler 650. The cooler 650 or portions thereof including a set of layers along one surface can be made of a thermally sensitive material 676, such as those described herein like layered aluminum alloy and AlSiC in one example, in order to position at least a portion of the cooler 650 to confront a greater or lesser area or volume of cooling airflow. As such, the cooling effectiveness can be balanced with minimizing aerodynamic drag.

Referring to FIG. 8A, the cooler 650 can be in an initial position, having a linear disposition such that the first surface 626 is disposed in the airflow 672. A mount 634 can be included with the cooler 650 at the axial center of the cooler 650 to mount the cooler 650 to the peripheral wall 43 of the fan casing 38. While the mount 634 is shown positioned at the center of the cooler 650, it should be understood that the mount 634 can be positioned anywhere along the cooler 650. A portion 636 of the airflow 672 can pass along the first surface 626 of the cooler 650 facing the airflow 672. The portion 636 can cool the cooler 650 using convection, such as for convectively cooling a flow of oil passing through the cooler 650 in one example.

Referring now to FIG. 8B, a forward section 638 and an aft section 640 can be defined forward and aft of the mount 634, respectively. The aft section 640, during a thermal condition, such as a decrease in temperature, can translate away from the airflow 672, such that a lesser portion 636 of the airflow 672, as compared to FIG. 8A, passes along the first surface 626. In the translated position, the aft portion can define an angle of attack α away from the airflow 672. In one example, the cooler 650 can be an air-cooled oil cooler for a turbine engine, having the aft portion 640 translated radially outward from a fan casing bypass airflow, into a gap 695 in the peripheral wall 43. The position shown in FIG. 8B can be employed during an off-peak cooling need or thermal condition, minimizing the volume or area of the airflow 672 contacting the cooler 650, to minimize aerodynamic drag when the cooling need of the cooler 650 is minimized.

Referring now to FIG. 8C, the aft section 640 has been translated into the airflow 672, such that a greater amount of the portion 636 of the airflow 672 contacts the first surface 626. The angle of attack α for the aft portion 640 is now into the airflow 672. In one example, the cooler 650 is the air-cooled oil cooler for the turbine engine 10 (FIG. 1), having the aft portion 640 translated radially inward into the airflow 672 as a bypass airflow passing through the fan casing. During a thermal condition requiring a greater amount of cooling at the cooler 650, such as peak demand condition, the aft portion 640 can translate into the airflow 672 to provide for increased convection at the cooler 650 to increase heat transfer and cooling effectiveness. In the translated position, the aerodynamic drag caused by the cooler 120 increases.

Referring now to FIG. 8D, the forward portion 638 is translated into a convex shape relative to the airflow 672. In a first example, the forward portion 638 can translate into the gap 695 in the peripheral wall 43. The portion 636 of the airflow 672 can enter the concavity 642 to provide increased cooling at the forward portion 638. In such a position, the airflow entering the concavity 642 can generate a vortical flow, which can increase the cooling effectiveness at the forward section 638. Additionally, the aerodynamic drag increases at the forward section 638.

Alternatively, the mount 634a, shown in dashed-line, can be disposed at a forward end 644 of the cooler 650. In this example, the forward section 638 is translated into the convex shape to confront a greater volume of the airflow 672, while positioning the aft portion 640 into the airflow 672. For example, the convex curvature of the first section 638 can translate the aft portion 640 radially outward into the airflow 672 flow path. As such, a greater amount of the airflow 672 contacts the forward section 638 and passes along the aft portion 640 from the forward section 638 to contact a greater surface area of the cooler 650. It should be appreciated that in this position, the aerodynamic drag increases while the cooling effectiveness increases.

Referring now to FIG. 8E, the forward section 638 has a concave shape or contour while the aft portion 640 has a concave shape or contour, relative to the airflow 672. As such, a serpentine shape for the cooler 650 is formed with an inflection point 602. In this position, the cooler 650 can confront a maximum amount of the airflow 672, while generating a maximum amount of aerodynamic drag. As such, maximum cooling by the cooler 650 can be achieved during a thermal condition requiring a peak cooling demand.

It should be appreciated that the shapes and contours as illustrated in FIGS. 8A-8E are exemplary and that any combination of the shapes and contours is contemplated. Additionally, the cooler 650 can be adapted to any such shape to increase or decrease an area of the cooler 650 confronting the airflow 672 based upon a thermal condition, to balance a need for cooling during demand conditions, while minimizing aerodynamic drag.

It should be appreciated that the forward and aft portions 638, 640 as defined in FIGS. 8B-8E are not limited based upon the mount 634, and can be positioned anywhere along the cooler 650. The position of the mount 634 can be incorporated with the particular shaping of the cooler 650 to properly position the translated cooler 650 into the airflow based upon the particular cooling demands of the engine.

Referring now to FIGS. 9A-9B, a side perspective view of an exemplary cooler 750 is illustrated in an initial position in FIG. 9A and a deployed position in FIG. 9B. The cooler 750 of FIGS. 9A-9B can be substantially similar to the cooler 50 of FIG. 2. As such, similar numerals will be used identify similar elements increased by a value of seven hundred.

Referring to FIG. 9A, the cooler 750 is illustrated in the initial position, with the body 770 having a linear arrangement, such as parallel to or substantially parallel to the horizontal axis of the engine or an airflow 772 passing along the cooler 750. A hinge 790 is illustrated as being located between adjacent, axial sets of fins 784. While only two sets of fins 784 are shown, any number of sets of fins 784 are contemplated.

A forward section 792 and an aft section 794 of the cooler 750 can be defined on either side of the hinge 790 or by the axially arranged sets of fins 784. Alternatively, the forward and aft sections 792, 794 can be defined as an axial division of the cooler 750. The forward or aft sections 792, 794 can be coupled to the peripheral wall 743 of the annular fan casing 738 at the thermally sensitive portion 776. The thermally sensitive portion 776 is disposed underneath the aft section 794 alone. As such, the thermally sensitive portion 776 can align with an aft edge 762. A mount 793 can couple the cooler 750 to a fan casing assembly 738.

Referring to FIG. 9B, the cooler 750 can respond to a condition, such as thermal condition, which can be an increase in temperature in one non-limiting example. The thermally sensitive portion 776 can actuate or move, translating the aft section 794 into the deployed position as shown, confronting a greater volume of the airflow 772. The thermally sensitive portion 776 can actuate based upon temperatures of a fluid passing through the body of the cooler 750. As such, actuation of the thermally sensitive portion 776 can be a passive translation of the cooler 750, where passive translation is one that is accomplished by the cooler 750 in response to the condition by the cooler 750 itself, at the thermally sensitive portion 776, without secondary intervention. In the deployed position, the aft section 794 is disposed at a first angle of attack $\alpha$, such as between 1 degrees to 25 degrees, in one non-limiting example. The positive value for the angle of attack $\alpha$ represents disposition into the airflow 772.

Additionally, the forward section 792 mounts to one or more mechanical actuators 796. The mechanical actuators 796 can actuate to raise the forward section 792 at an angled disposition to confront a greater volume of the airflow 772. In one non-limiting example, the mechanical actuator 796 can be a piston. The angled disposition of the forward section 792 can define a second angle of attack $\beta$. The second angle of attack $\beta$ can be between 1 and 25 degrees, or example. As such, the mechanical actuators 796 can be an active translation of the cooler 750 for positioning the cooler 750 to confront a greater volume of airflow 772. Active translation is one that is accomplished through secondary intervention, such as by the mechanical actuators 796. Such active translation can be accomplished by instruction from a system, a user, and typically requires additional parts for the assembly.

As the mechanical actuators 796 move the forward section 792 into the airflow 772, the attached aft section 794 also confronts a greater volume of the airflow 772. When both the forward and aft sections 792, 794 are translated, the cooler 750 confronts a greater volume of the airflow 772 that translation of one section 792, 794 alone. Such a translation can be represented by a third angle of attack $\Delta$, which can be the combination of the first and second angles of attack $\alpha$, $\beta$, and can be between 5-degrees and 35-degrees, for example.

As such, it should be understood that the cooler 750 can include a combination of both active and passive methods of translation of the cooler 750 into the airflow 772, actuating the mechanical actuators 796 or the thermally sensitive portion 776 respectively. Therefore, the cooler 750 can be both operably controlled and tailored to discrete temperature changes in the system. For example, if the mechanical actuator actively translates the forward section 792 into the airflow 772, and no additional cooling is needed, the temperature will remain low enough to prevent actuation of the thermally sensitive portion 776. Therefore, the active translation of the mechanical actuator 796 can be used for on demand cooling, while the thermally sensitive portion 776 can be used to increase or temper such cooling as is desirable to balance cooling effectiveness with engine efficiency.

Referring now to FIGS. 10A-10B, a side perspective view of an exemplary cooler 850 is illustrated in an initial position in FIG. 10A and a deployed position in FIG. 10B. The cooler 850 of FIGS. 10A-10B can be substantially similar to the cooler 750 of FIGS. 9A-9B. As such, similar numerals will be used identify similar elements increased by a value of one hundred.

Referring to FIG. 10A the cooler 850 is illustrated in the initial position, with the body 870 having a forward section 892 and an aft section 894. The forward section 892 is offset from the linear arrangement of the aft section 894, with the aft section 894 being parallel to or substantially parallel to the horizontal axis of the engine or an airflow 872 passing along the cooler 850. A horizontal axis 897 can be defined parallel to the airflow 872, or alternatively, the engine centerline 12 (FIG. 1), and extending from the aft section 894. An offset axis 898 can be defined along the longitudinal length of the forward section 892, defining an offset angle 899 from the horizontal axis 897. The offset angle 899 can be between 1-25 degrees, for example, while greater angles are possible.

A hinge 890 is illustrated as being located between adjacent, axial sets of fins 884. While only two sets of fins 884 are shown, any number of sets of fins are contemplated. The forward section 892 and an aft section 894 of the cooler 850 can be defined on either side of the hinge 890 or the axially arranged sets of fins 884. Alternatively, the forward and aft sections 892, 894 can be defined as an axial division of the cooler 850. The forward or aft sections 892, 894 can be coupled to the peripheral wall 843 of the annular fan casing 838 at a thermally sensitive portion 876. The thermally sensitive portion 876 is disposed underneath the aft section 894 alone. As such, the thermally sensitive portion 876 can align with an aft edge 862 of the cooler 850. A mount 893 can be used to mount the cooler 850 to the fan casing assembly 838.

Referring to FIG. 10B, the thermally sensitive portion 876 can actuate or move, translating the aft section 894 into the deployed position confronting a greater volume of the airflow 872 in response to a condition, such as a thermal condition. The thermally sensitive portion 876 can actuate based upon temperatures of the cooler 850, for example. As such, actuation of the thermally sensitive portion 876 can be a passive translation of the cooler 850. In the deployed position, the aft section 894 is disposed at a positive angle of attack α, such as between 1 degrees to 35 degrees, in one non-limiting example.

The forward section 892 is positioned at the offset angle 899 to confront a greater area of the airflow 872. With the aft section 894 positioned behind the forward section 892, the airflow 872 can be deflected over the aft section 894, and the effectiveness of the aft section 894 is minimized. As such, the thermally sensitive portion 876 can actuate to translate the aft section 876 into the airflow 872 above the forward portion 892 to further improve cooling effectiveness of the cooler 850.

As such, it should be appreciated that the thermally sensitive portion 876 can passively actuate the aft section 894 into or out of the airflow 872 to increase or decrease the volume of the airflow 872 confronting the fins 874. Thus, the cooler 850 can be tailored to balance cooling effectiveness with engine efficiency.

A method of moving an air-cooled oil cooler within a bypass fan duct of an aircraft engine can include positioning the air-cooled oil cooler in the bypass fan duct when a first reference temperature is reached. The positioning can be a passive positioning and can include a thermally sensitive portion of the air-cooled oil cooler changing shape in response to a change in a thermal condition.

The air-cooled oil cooler can be any cooler as described herein. The bypass fan duct can be the annular passage 36 of FIG. 1 or any other annular air or fluid passage, or bypass passage in the engine. The positioning is a passive positioning, requiring no actively driven components, such as by mechanical actuation. The thermally sensitive portion can be any of the thermally sensitive portions as described herein that can change shape in response to a change in thermal condition, such as a change in temperature, for example.

The first reference temperature can be a threshold temperature that positions or translates the cooler into the bypass duct. Such a threshold temperature can be a maximum demand temperature, such as the temperature reached during maximum engine operation, such as during acceleration, or maximum thrust. As such, the positioned cooler into the bypass duct increases cooling effectiveness of the cooler, but can negatively impact engine efficiency with increased aerodynamic drag.

Additionally, the method can include passively retracting the air-cooled oil cooler from the bypass fan duct when a second reference temperature is reached. The second reference temperature can be a temperature lower than the first reference temperature. Upon reaching the second reference temperature, after positioning the cooler in the bypass fan duct at the first references temperature, the cooler can retract by actuation of the thermally sensitive portion at the second reference temperature. The retracted cooler has a reduction in cooling efficiency, but can be done during a lower engine demand, such as at idle or cruise. The retracted cooler provides a reduction in aerodynamic drag, while minimizing cooling effectiveness. Thus, utilizing the first and second reference temperatures, it should be appreciated that the cooler can balance the needs for cooling with engine efficiency by minimizing drag during a lower demand thermal condition.

Furthermore, the positioning of the air-cooled oil cooler in the bypass fan duct can include increasing an attack angle orientation of the air-cooled oil cooler. For example, increasing the attack angle orientation can include increasing the angle for the angle of attack α as described herein. The attack angle can be particularly determined, for example, based upon the concentration of SiC in an AlSiC layer of the thermally sensitive material. For example, the greater the amount of SiC, or the greater the local concentration, the greater the curvature that can be seen in the thermally sensitive material.

The above disclosure provides for an improved design for a surface cooler or heat exchanger for convectively cooling a quantity of fluid transferred from the engine. The cooler includes thermally sensitive material for passively positioning, translating, or actuating the cooler to improve convection at the cooler. The cooler is passively activated to deploy and optimally position the forced-air cooled heat exchangers into the airflow path of the engine during peak engine conditions. Additionally, such deployment, passive positioning, translating, or actuating can decrease convective cooling by moving the cooler out of the airflow path based upon a decreased demand need in order to minimize aerodynamic drag to improve engine efficiency. As such, it should be appreciated that the cooler is a demand based passive system to selectively position the cooler to increase cooling or minimize drag based upon the demand. Thus, the cooler passively balances the need for cooling with engine efficiency.

The invention uniquely incorporates the continuous conformal geometric change and actuation directly into the laminate composite metal structure of the heat exchangers or cooler body. Differential cooler temperatures, positive or negative, from the stabilized reference temperature, such as the temperature during ultrasonic bonding can be used to continuously change the shape of the cooler body. Temperatures above or below the stabilized reference temperature can positively or negatively change the curvature of the cooler. The temperature dependent shape change is controlled and tuned by the laminate geometry and bonding of the aluminum allows with aluminum MMC, AlSiC. Aluminum and AlSiC are chosen for their high strength to density ration and high thermal conductivity. Ultrasonic additive manufacturing is used to laminate the dissimilar materials to produce the bi-metallic effect between high strength aluminum alloy plates and MMC AlSiC. The composition of AlSiC volume fraction percentage of SiC can tune the coefficient of thermal expansion of the thermally sensitive material. Depending on the percentage of SiC, the coefficient of thermal expansion can vary from 20 to 7 ppm/C in one example. Integration of the actuation design into the cooler or thermally sensitive material allows for use with most bypass air heat exchangers.

The foregoing has described a heat exchanger apparatus comprising an air-cooled oil cooler to passively position the cooler into or out of the cooling airflow. While the present disclosure has been described with respect to a limited number of embodiments, those skilled in the art, having benefit of this disclosure, will appreciate that other embodiments can be devised which do not depart from the scope of the disclosure as described herein. While the present disclosure has been described with reference to exemplary embodiments, it will be understood by those skilled in the art that various changes can be made and equivalents can be substituted for elements thereof without departing from the scope of the disclosure. In addition, many modifications can be made to adapt a particular situation or material to the teachings of the present disclosure without departing from the essential scope thereof. For example, the cooler described herein can be configured for use in many different types of aircraft engine architectures, in addition to the example engine describe herein, such as, but not limited to a multi-spool design (additional compressor and turbine section), a geared turbo fan type architecture, engines including un-ducted fans, single shaft engine designs (single compressor and turbine sections), or the like. In addition, the bypass valve disclosed herein will work equally well with other types of air-cooled oil coolers, and as such is not intended to be limited to surface coolers, and can be configured for use in other cooler types, such as plate and fin, tube-fin types, or the like would benefit as well. Further still it will be understood that depending on the internal passage geometry of the valve and the inlet port and outlet port orientations, the flow through the valve can be in-plane (i.e. traverse) or out-of-plane (i.e. axial). Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan casing cooler for a fan casing having a peripheral wall, the fan casing cooler, comprising:
    a body having at least one conduit therein, an exterior of the body defining a first surface confronting the peripheral wall, a second surface that is opposite the first surface, and at least one thermally sensitive portion at least partially defining the first surface; and
    at least one hinge provided in the body wherein the at least one hinge comprises a channel recessed into the second surface of the body;
    wherein the at least one conduit is configured to carry a flow of fluid proximal to the second surface and arranged to transfer heat from the fluid to air flowing through the fan casing and the at least one thermally sensitive portion is arranged such that in use and in response to a change in a thermal condition at least a portion of the fan casing cooler is passively positioned away from the peripheral wall of the fan casing and into the air flowing through the fan casing.

2. The fan casing cooler of claim 1 wherein the body comprises a set of metal layers as the at least one thermally sensitive portion responsive to the change in the thermal condition.

3. The fan casing cooler of claim 2 wherein the set of metal layers further comprises a layer of aluminum alloy and a layer of aluminum silicon carbide.

4. The fan casing cooler of claim 1 wherein the body further comprises one of segmented continuous fins or discrete fins on a portion of the body opposite the first surface.

5. The fan casing cooler of claim 4 wherein the body is configured to increase an attack angle orientation of the segmented continuous fins or discrete fins in response to the change in the thermal condition.

6. The fan casing cooler of claim 1 wherein a forward section or an aft section of the body is operably coupled to the peripheral wall of the fan casing.

7. The fan casing cooler of claim 6 wherein the forward section of the body is disposed at an offset angle from the aft section of the body.

8. The fan casing cooler of claim 6 further comprising a mechanical actuator coupled to the forward section and operable by an instruction to the mechanical actuator to actively position the at least a portion of the fan casing cooler into the air flowing through the fan casing, and wherein the at least one thermally sensitive portion is operably coupled to the aft section to passively position the at least a portion of the fan casing cooler into the air flowing through the fan casing.

9. The fan casing cooler of claim 1 wherein a center section of the fan casing cooler is operably coupled to the peripheral wall of the fan casing and a forward portion of the fan casing cooler curves concavely and an aft portion of the fan casing cooler curves convexly in response to the change in the thermal condition.

10. A heat exchanger body, comprising:
    at least one conduit;
    a first surface defining a first exterior surface;
    a second surface defining a second exterior surface, the second surface opposite the first surface;
    at least one hinge in the body wherein the at least one hinge comprises a channel recessed into the second surface of the body;
    at least one thermally sensitive portion at least partially forming the heat exchanger body and defining at least a portion of the first surface, the thermally sensitive portion configured to change shape in response to a change in a thermal condition;
    wherein the at least one conduit is configured to carry a flow of fluid proximal to the second surface to transfer heat from the fluid to an airflow passing along the second surface and the thermally sensitive portion is configured to passively position at least a portion of the heat exchanger body into the airflow.

11. The heat exchanger body of claim 10 wherein the at least one thermally sensitive portion of the heat exchanger body is proximal to the first surface and includes a set of metal layers responsive to a change in a thermal condition.

12. The heat exchanger body of claim 11 wherein the set of metal layers includes a layer of aluminum alloy and a layer of aluminum silicon carbide.

13. A cooler assembly for an engine casing having a peripheral surface and a gap in the peripheral surface, the cooler assembly, comprising:
    a body defining a periphery including a first surface and a second surface that is opposite the first surface;
    at least one hinge in the body wherein the at least one hinge comprises a channel recessed into the second surface of the body;
    at least one conduit located within the body, the at least one conduit configured to carry a flow of fluid proximal to the second surface; and at least one thermally sensitive portion included within the body and configured to, in response to a change in a thermal condition as an increase in temperature or a decrease in temperature, passively position at least a portion of the body into an airflow flowing along the second surface or passively position the at least a portion of the body into the gap in the peripheral surface of the engine casing, depending on whether the change in the thermal condition is the increase in temperature or the decrease in temperature.

14. The cooler assembly of claim 13 wherein the at least one thermally sensitive portion forms a portion of the body proximal to the first surface.

15. The cooler assembly of claim 14 wherein the portion of the body proximal to the first surface includes a set of metal layers responsive to the change in the thermal condition.

16. A heat exchanger body, comprising:
a first surface a second surface opposite the first surface;
discrete fins on a portion of the heat exchanger body opposite the first surface;
at least one hinge provided between at least some of the discrete fins wherein the at least one hinge comprises a channel recessed into the second surface; and
at least one thermally sensitive portion at least partially forming the heat exchanger body and defining at least a portion of the first surface, the thermally sensitive portion configured to change shape in response to a change in a thermal condition;
wherein at least one conduit is configured to carry a flow of fluid proximal to the second surface to transfer heat from the fluid to an airflow passing along the second surface and the thermally sensitive portion is configured to passively position at least a portion of the heat exchanger body into the airflow.

* * * * *